(12) United States Patent
Suh

(10) Patent No.: US 10,485,224 B2
(45) Date of Patent: Nov. 26, 2019

(54) EGG SUPPORT ASSEMBLY, AND ASSOCIATED DEVICE AND METHOD

(71) Applicant: Zoetis Services LLC, Parsippany, NJ (US)

(72) Inventor: William Dongwook Suh, Cary, NC (US)

(73) Assignee: Zoetis Services LLC, Parsippany, NJ (US)

(*) Notice: Subject to any disclaimer, the term of this patent is extended or adjusted under 35 U.S.C. 154(b) by 0 days.

(21) Appl. No.: 15/864,226

(22) Filed: Jan. 8, 2018

(65) Prior Publication Data

US 2018/0125039 A1 May 10, 2018

Related U.S. Application Data

(62) Division of application No. 14/659,699, filed on Mar. 17, 2015, now Pat. No. 9,894,886.

(60) Provisional application No. 61/970,394, filed on Mar. 26, 2014.

(51) Int. Cl.
*A01K 45/00* (2006.01)
*B65D 85/32* (2006.01)
*A01K 41/06* (2006.01)

(52) U.S. Cl.
CPC .......... *A01K 45/007* (2013.01); *A01K 41/065* (2013.01); *B65D 85/32* (2013.01)

(58) Field of Classification Search
CPC ............ B65G 2201/0208; A01K 45/00; A01K 41/065; A01K 41/007
USPC ........ 119/6.8, 337, 440; 198/345.1; 254/104
See application file for complete search history.

(56) References Cited

U.S. PATENT DOCUMENTS

| | | | |
|---|---|---|---|
| 369,753 A | | 9/1887 | Tellefson et al. |
| 540,502 A | * | 6/1895 | Leak et al. ........... B65D 85/321 |
| | | | 217/18 |
| 1,500,939 A | * | 7/1924 | Howell ................... B65B 23/08 |
| | | | 294/87.12 |
| 2,177,595 A | * | 10/1939 | Freed ...................... B65B 23/08 |
| | | | 294/100 |

(Continued)

FOREIGN PATENT DOCUMENTS

WO  WO 2003/094607 A1  11/2003
WO  WO 2013/152970 A2  10/2013

(Continued)

OTHER PUBLICATIONS

International Search Report and Written Opinion, International Application No. PCT/US2015/020845, dated Jul. 9, 2015.

*Primary Examiner* — Magdalena Topolski
*Assistant Examiner* — Morgan T Barlow
(74) *Attorney, Agent, or Firm* — Scott C. Mayhew

(57) ABSTRACT

An egg processing apparatus is provided. Such an apparatus includes a plurality of egg processing devices configured to interact with a plurality of eggs carried by an egg carrier. An egg support assembly is positioned beneath the egg processing devices such that an egg carrier is capable of being moved between the egg processing devices and the egg support assembly. The egg support assembly includes a plurality of pedestals, with each pedestal having a plurality of discrete egg support members cooperating to form a seating arrangement portion for contacting and supporting an end of an egg in the egg carrier. An associated assembly and method are also provided.

10 Claims, 13 Drawing Sheets

(56) References Cited

U.S. PATENT DOCUMENTS

| | | | |
|---|---|---|---|
| 2,666,665 A * | 1/1954 | Whitcher | A23B 5/065 |
| | | | 294/87.12 |
| 2,792,253 A * | 5/1957 | Bliss | B65B 23/08 |
| | | | 294/100 |
| 3,147,844 A * | 9/1964 | Mountz | A01K 43/00 |
| | | | 198/458 |
| 3,377,989 A | 4/1968 | Sandhage et al. | |
| 3,543,903 A | 12/1970 | Lodige | |
| 4,302,142 A | 11/1981 | Kuhl et al. | |
| 4,382,580 A | 5/1983 | Hellander | |
| 4,425,110 A | 1/1984 | Gruger et al. | |
| 4,469,047 A | 9/1984 | Miller | |
| 4,524,630 A | 6/1985 | Toth et al. | |
| 4,593,646 A | 6/1986 | Miller et al. | |
| 4,739,871 A | 4/1988 | Maier et al. | |
| 4,772,001 A | 9/1988 | Hurdle, Jr. | |
| 4,843,958 A | 7/1989 | Egosi | |
| 5,101,954 A | 4/1992 | Nambu | |
| 5,104,281 A | 4/1992 | Corvi | |
| 5,136,979 A | 8/1992 | Paul et al. | |
| 5,158,038 A | 10/1992 | Sheeks et al. | |
| 5,167,317 A | 12/1992 | van der Schoot et al. | |
| 5,242,388 A | 9/1993 | Marshall, Sr. | |
| 5,620,224 A | 4/1997 | DiBiagio et al. | |
| 5,722,639 A | 3/1998 | Nonaka | |
| 5,900,929 A | 5/1999 | Hebrank et al. | |
| 6,234,320 B1 | 5/2001 | Hebrank | |
| 6,240,877 B1 | 6/2001 | Bounds | |
| 6,244,569 B1 | 6/2001 | Canella et al. | |
| 6,287,068 B1 | 9/2001 | Canella et al. | |
| 6,345,855 B2 | 2/2002 | Hanser et al. | |
| 6,427,305 B1 | 8/2002 | Graham et al. | |
| 6,593,129 B1 | 7/2003 | Takeshita et al. | |
| 6,601,533 B1 | 8/2003 | Bounds, Jr. | |
| 6,981,470 B2 | 1/2006 | Gross et al. | |
| 7,261,053 B2 | 8/2007 | Karaca et al. | |
| 7,351,019 B2 | 4/2008 | Bosker et al. | |
| 7,430,987 B2 | 10/2008 | Smith | |
| 7,438,019 B2 | 10/2008 | Lofink, Jr. et al. | |
| 7,475,770 B1 | 1/2009 | Strange et al. | |
| 7,573,566 B2 | 8/2009 | Hebrank et al. | |
| 7,721,674 B2 | 5/2010 | Smith | |
| 8,201,518 B2 | 6/2012 | Smith | |
| 8,205,736 B2 | 6/2012 | Ando et al. | |
| 8,307,784 B2 | 11/2012 | Nadreau et al. | |
| 8,342,311 B2 | 1/2013 | Philipp | |
| 8,696,297 B2 | 4/2014 | Mogenet et al. | |
| 9,395,346 B2 | 7/2016 | Walukas et al. | |
| 9,513,270 B2 | 12/2016 | Walukas et al. | |
| 9,522,808 B2 | 12/2016 | Suh | |
| 2003/0151035 A1 * | 8/2003 | Stephen | A62B 3/005 |
| | | | 254/104 |
| 2004/0144324 A1 | 7/2004 | Gross et al. | |
| 2006/0156989 A1 | 7/2006 | Hebrank | |
| 2009/0078205 A1 * | 3/2009 | Hebrank | A01K 43/00 |
| | | | 119/6.8 |
| 2009/0183685 A1 | 7/2009 | Correa et al. | |
| 2010/0288602 A1 | 11/2010 | Pfankuch | |
| 2010/0292834 A1 | 11/2010 | Mirandola | |
| 2011/0067633 A1 | 3/2011 | Correa et al. | |
| 2012/0138740 A1 | 6/2012 | Seifert | |
| 2013/0088702 A1 | 4/2013 | Peijster | |
| 2013/0104805 A1 | 5/2013 | Steen et al. | |
| 2013/0140135 A1 * | 6/2013 | Tan | H01L 21/67706 |
| | | | 198/345.1 |
| 2013/0319335 A1 | 12/2013 | Hebrank et al. | |
| 2014/0014040 A1 | 1/2014 | Mukaddam et al. | |
| 2014/0103277 A1 * | 4/2014 | Cormack | B66F 7/065 |
| | | | 254/89 R |
| 2014/0238165 A1 | 8/2014 | Shiroma | |
| 2015/0272085 A1 | 10/2015 | Suh | |
| 2015/0327520 A1 * | 11/2015 | Van de Zande | A01K 45/007 |
| | | | 119/6.8 |

FOREIGN PATENT DOCUMENTS

| | | |
|---|---|---|
| WO | WO 2015/037995 A1 | 3/2015 |
| WO | WO 2015/044547 A1 | 4/2015 |

* cited by examiner

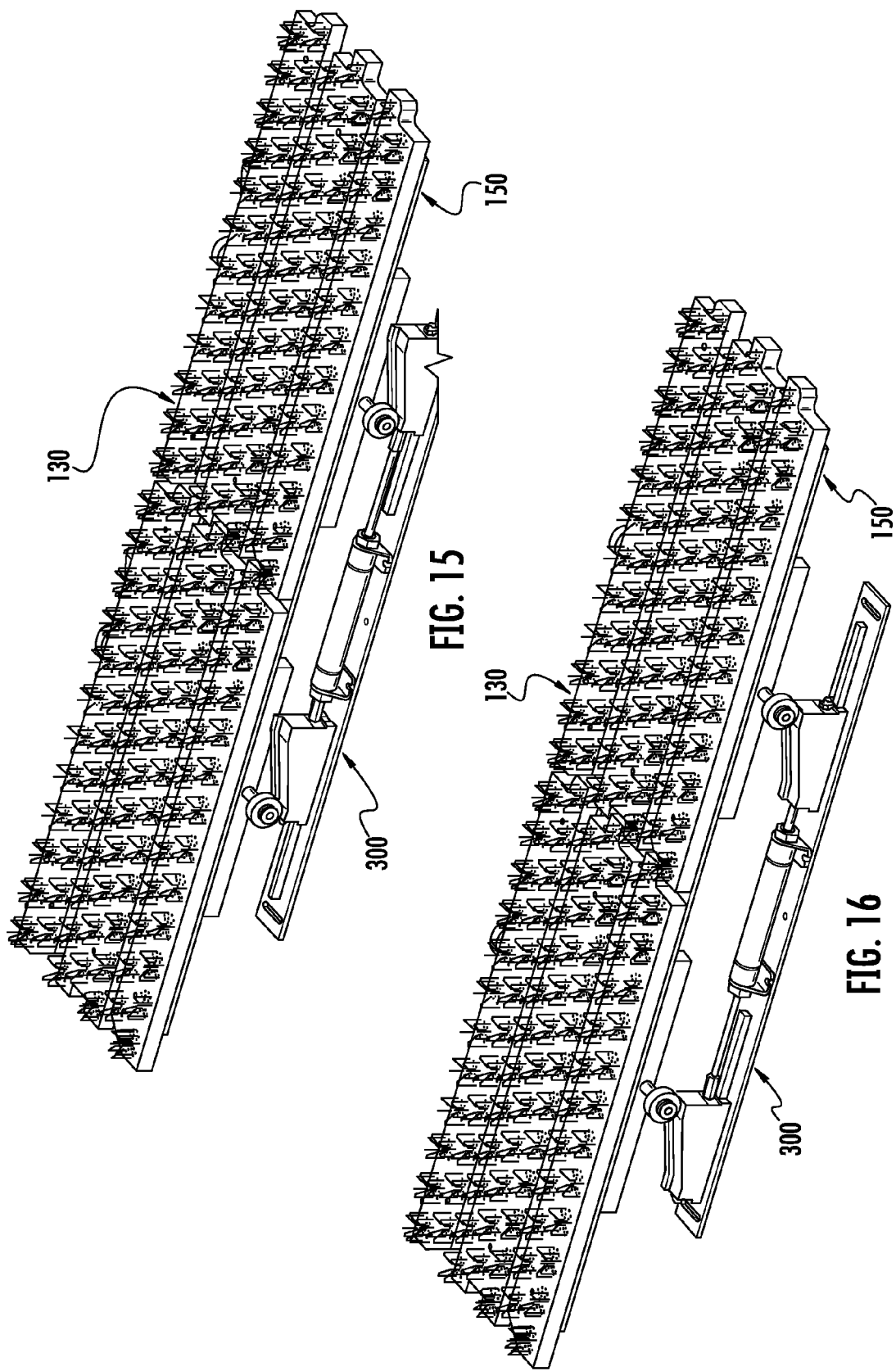

EGG SUPPORT ASSEMBLY, AND ASSOCIATED DEVICE AND METHOD

CROSS REFERENCE TO RELATED APPLICATION

This application is a divisional of U.S. application Ser. No. 14/659,699, filed Mar. 17, 2015, which claims the benefit of U.S. Provisional Patent Application No. 61/970,394, filed Mar. 26, 2014, both of which are expressly incorporated herein by reference in their entirety.

TECHNICAL FIELD

The present disclosure generally relates to egg processing apparatuses. More particularly, the present disclosure relates to an egg support assembly capable of supporting eggs contained within an egg flat or carrier during a processing event, and an associated apparatus and method.

BACKGROUND

Various mechanical egg processing apparatuses are used to process avian eggs within a poultry hatchery facility. Such mechanical egg processing systems may include, for example, an egg injection apparatus for injecting a treatment substance into an egg, an egg transfer apparatus for transferring eggs, and an egg removal apparatus for removing selected eggs. Such apparatuses include a plurality of individual processing devices (e.g., injection tool, egg removal or transfer tool) conventionally designed to operate in conjunction with commercial egg carrier devices (so-called "flats"). Egg flats utilized in conjunction with such apparatuses typically contain an array of pockets that are configured to support a respective plurality of eggs in a generally upright or vertical orientation. Each pocket may contain a plurality of tabs that are configured to support a respective egg. Although effective in supporting eggs during transport, these support tabs can damage eggs during processing by the individual processing devices. The forces applied to an egg, particularly during an injection sequence, may push an egg downwardly against the support tabs with sufficient force to cause the egg to crack. As such, egg processing apparatuses may employ an egg support assembly capable of providing support to the eggs in the egg carrier during the processing sequence, such as those disclosed in U.S. Pat. No. 6,981,470 to Gross et al. or PCT International Publication No. WO 2013/152970 to Van de Zande.

However, egg flats and the associated individual pockets thereof are arranged in many different shapes, sizes and geometric configurations, depending on the manufacturer. Accordingly, egg support assemblies must be customized such that the individual egg support portions (bushings or pedestals) thereof (i.e., the portions contacting the egg) can fit and ascend/descend within the individual pockets to contact and support the eggs. In this regard, the egg support bushings must be customized to cooperate with a particular egg flat configuration. Currently, Zoetis LLC (assignee of the present application) provides over twenty types of custom egg support bushings needed to cooperate with the various egg flats configurations used by its customers. Such customization of the egg support assemblies increases manufacturing costs since machining of the egg support portions is more cost effective than a molding process due to small volume needs, which makes molding processes an expensive and unrealistic option for manufacturing. Such customized solutions may also provide egg support bushings that are difficult and time-consuming to clean. Additionally, current egg support assemblies have drive mechanisms that may expend excessive amounts of energy, provide operational inefficiencies, and add additional costs, as used to lift the egg support assembly into contact with the eggs in the egg flat.

Accordingly, it would be desirable to provide an egg support assembly and associated apparatus capable of supporting eggs in a simplified and cost effective manner while also improving the ease of maintenance of such an egg support assembly and apparatus, and further reducing customization associated therewith. Furthermore, it would be desirable to provide an associated method that would simplify and facilitate improved support of eggs during a processing event. Moreover, it would be desirable to provide an apparatus and associated method capable of providing an improved drive mechanism for an egg support assembly.

BRIEF SUMMARY

The above and other needs are met by aspects of the present disclosure which, according to one aspect, provides an egg support assembly having a plate and a plurality of pedestals operably engaged with the plate. Each pedestal has a plurality of discrete egg support members cooperating to form a seating arrangement portion for receiving and contacting an end of an egg so as to provide support thereto.

Another aspect provides an egg processing apparatus having a plurality of egg processing devices configured to interact with a plurality of eggs carried by an egg carrier. An egg support assembly is positioned beneath the egg processing devices and has a plurality of pedestals. Each pedestal has a plurality of discrete egg support members cooperating to form a seating arrangement portion for contacting and supporting an end of an egg in the egg carrier.

Yet another aspect provides a method of supporting eggs during an egg processing sequence. The method comprises positioning an egg carrier containing a plurality of eggs beneath a plurality of egg processing devices configured to interact with respective eggs in the egg carrier for processing thereof. The method further comprises moving an egg support assembly positioned beneath the egg carrier to an operative position such that each of a plurality of pedestals contact and support a respective egg within the carrier, each pedestal having a plurality of discrete egg support members cooperating to form a seating arrangement portion for contacting and supporting an end of the respective egg in the egg carrier.

Still yet another aspect provides an egg processing apparatus having a plurality of egg processing devices configured to interact with a plurality of eggs carried by an egg carrier. An egg support assembly is positioned beneath the egg processing devices and has a plurality of pedestals. Each pedestal is configured to contact and provide support to a respective egg in the egg carrier. A drive assembly is configured to move the egg support assembly between an operative position and a retracted position. The drive assembly has a plurality of actuators and at least one ramp member operably engaged with each actuator. The ramp member is movable along a first axis. The drive assembly further includes a plurality of translating members operably engaged with the egg support assembly and configured to interact with a respective ramp member. The translating members are movable along a second axis non-parallel to the first axis, wherein movement of the ramp members along the first axis causes movement of the translating members along the second axis so as to facilitate movement of the egg support assembly between the operative and retracted positions.

Another aspect provides a method of supporting eggs during an egg processing sequence. The method comprises positioning an egg carrier containing a plurality of eggs beneath a plurality of egg processing devices configured to interact with respective eggs in the egg carrier for processing thereof. The method further comprises moving an egg support assembly positioned beneath the egg carrier to an operative position by moving a plurality of ramp members along a first axis using a plurality of actuators, thereby causing interaction with and movement of a plurality of translating members along a second axis non-parallel to the first axis. The translating members are operably engaged with the egg support assembly such that movement of the translating members along the second axis facilitates movement of the egg support assembly between the operative position and a retracted position.

Thus, various aspects of the present disclosure provide advantages, as otherwise detailed herein.

BRIEF DESCRIPTION OF THE DRAWINGS

Figure 1:
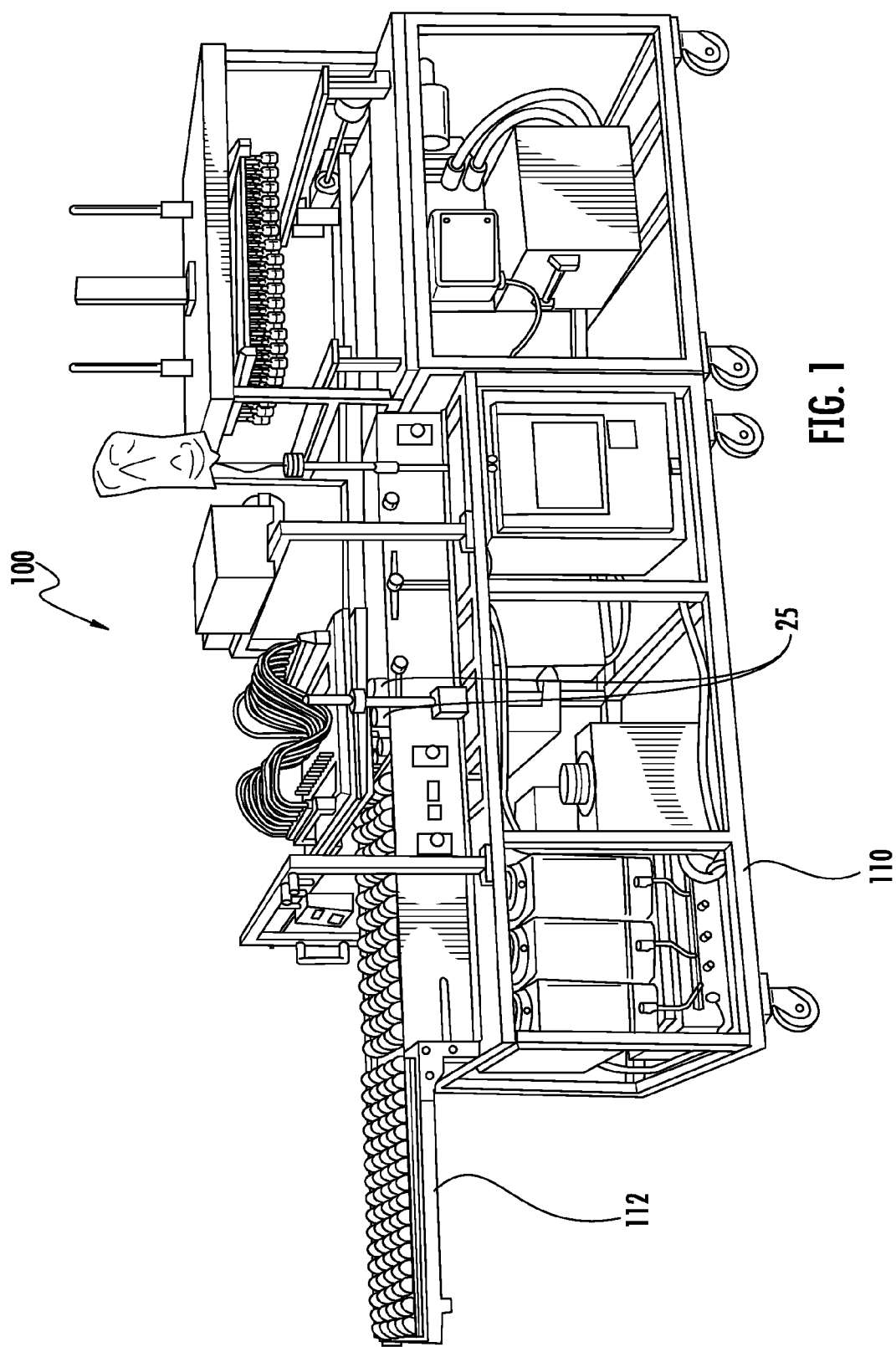
Figure 2:
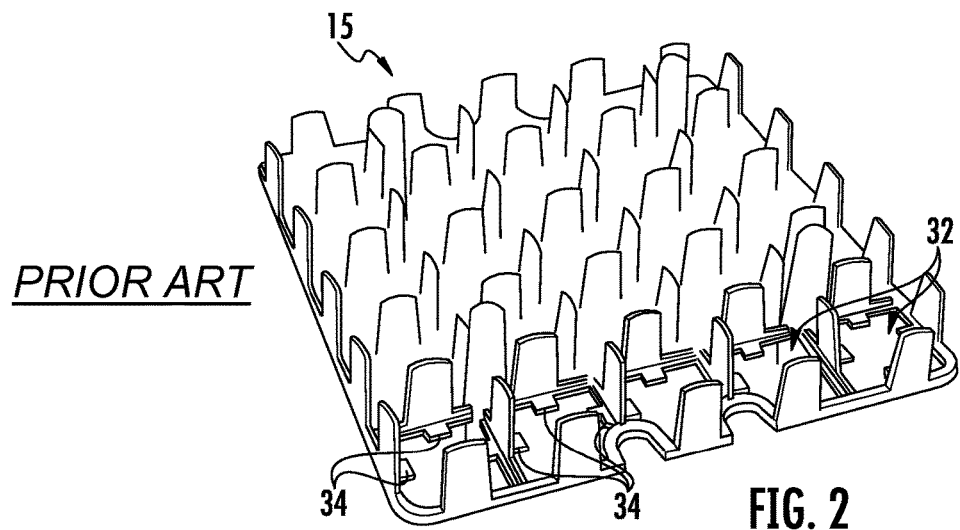
Figure 3:
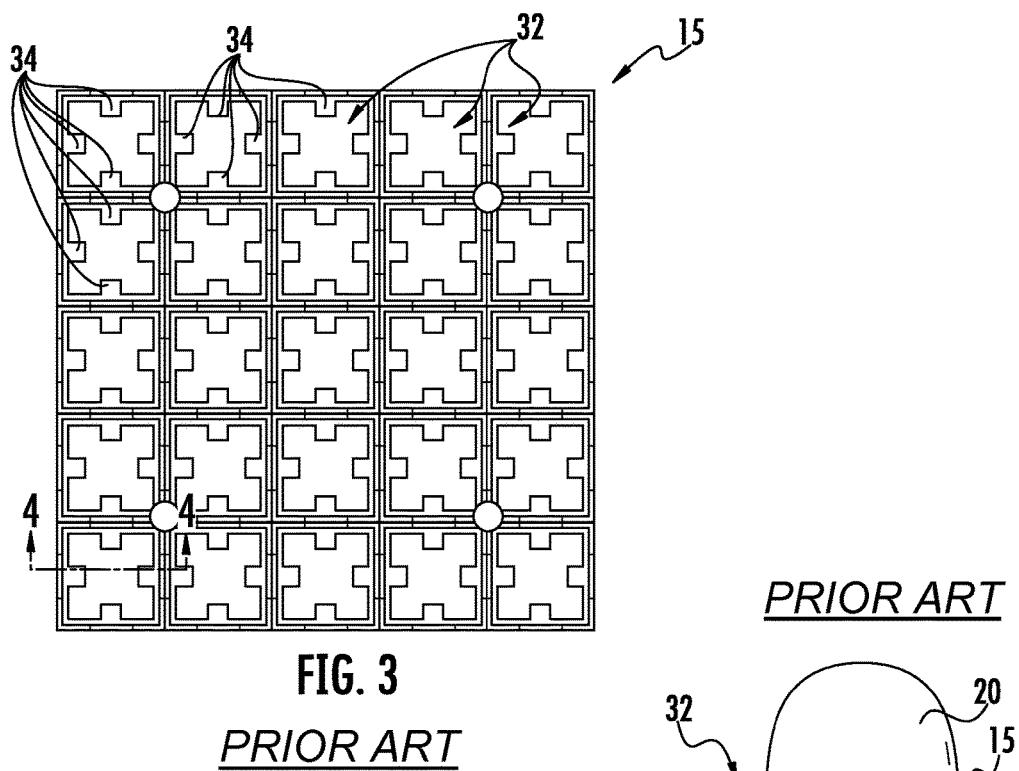
Figure 4:
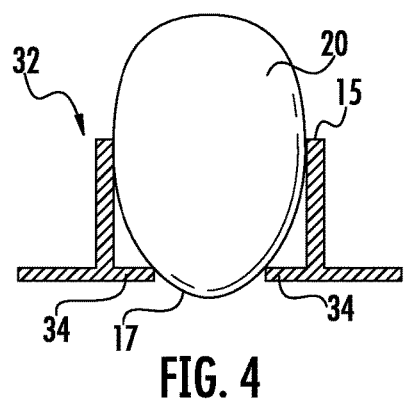
Figure 5:
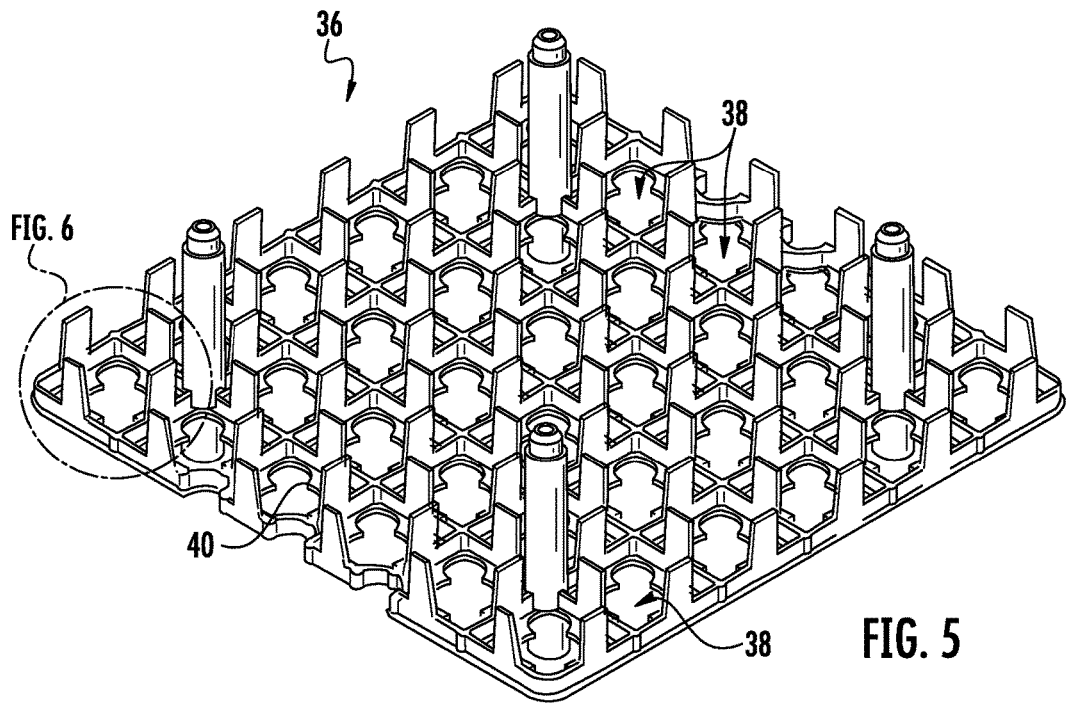
Figure 6:
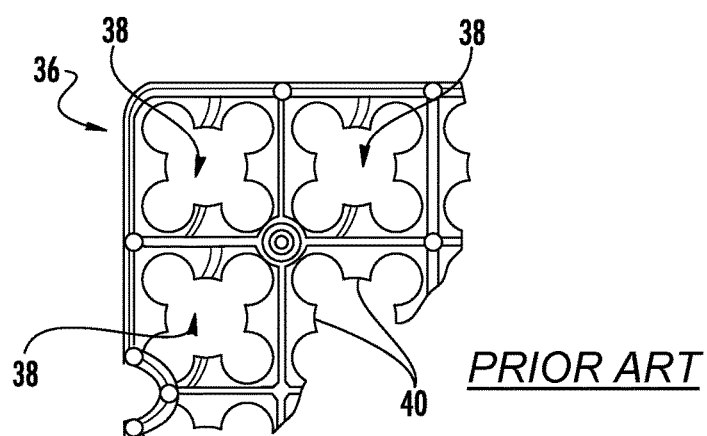
Figure 7:
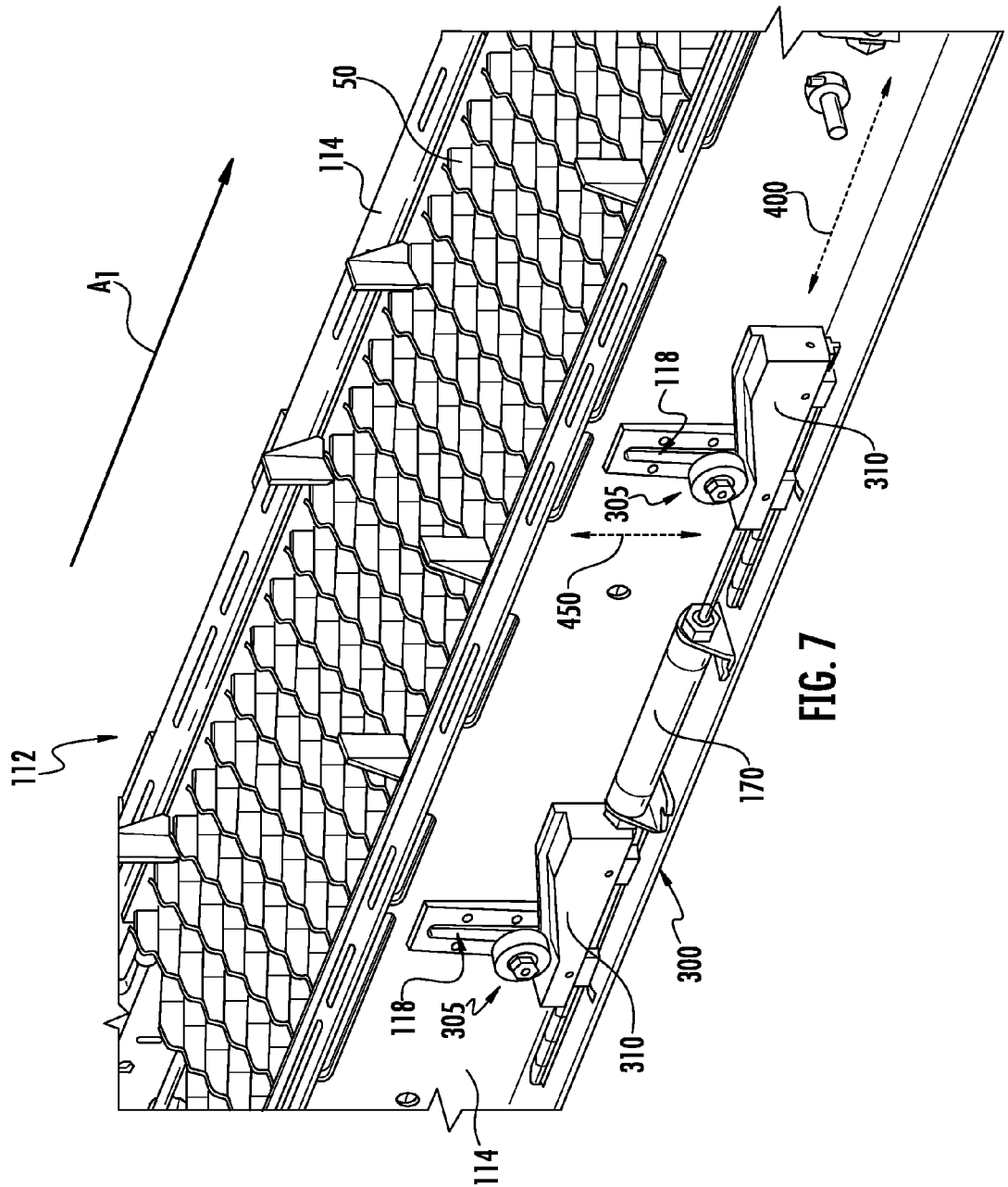
Figure 8:
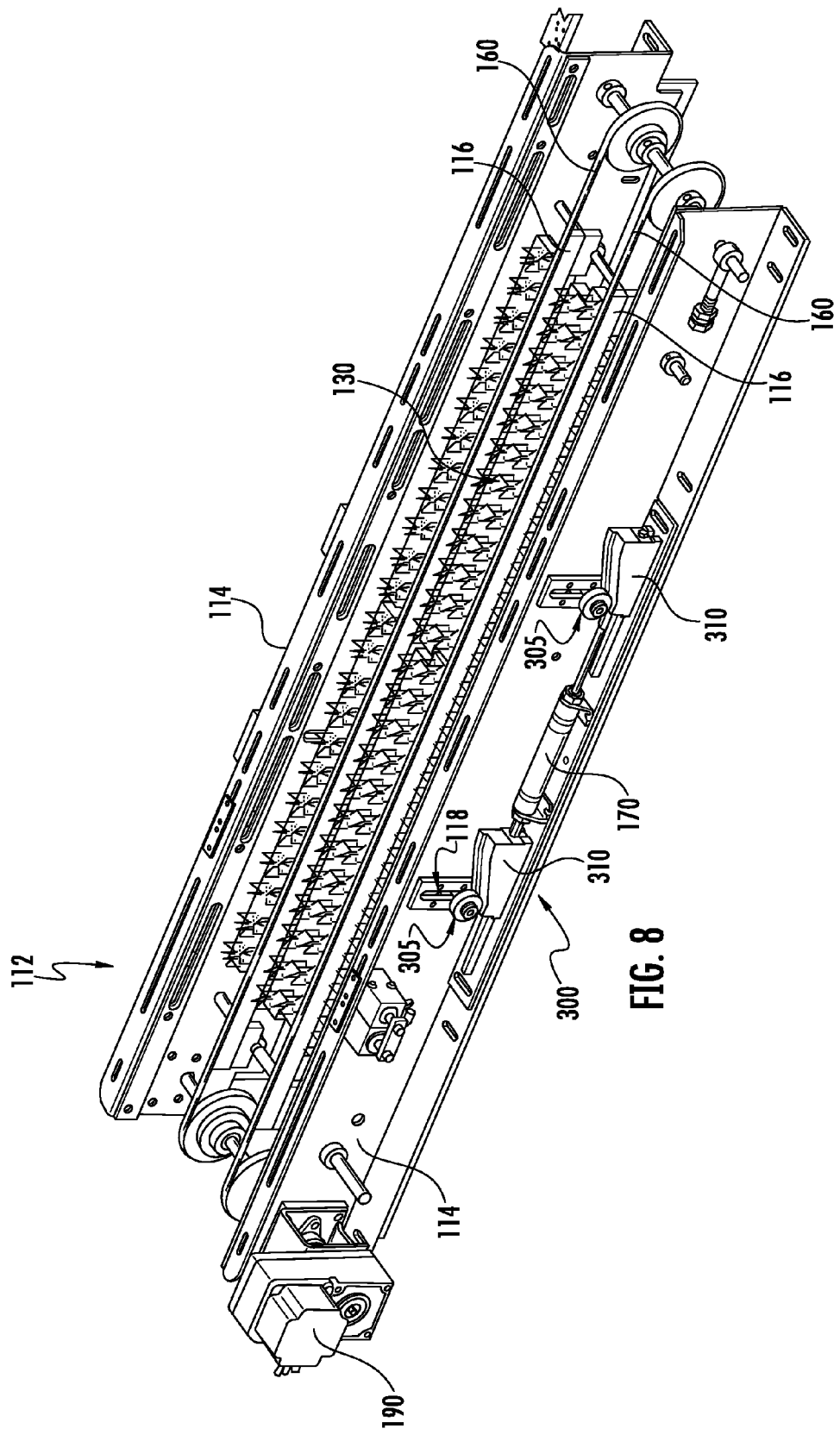
Figure 9:
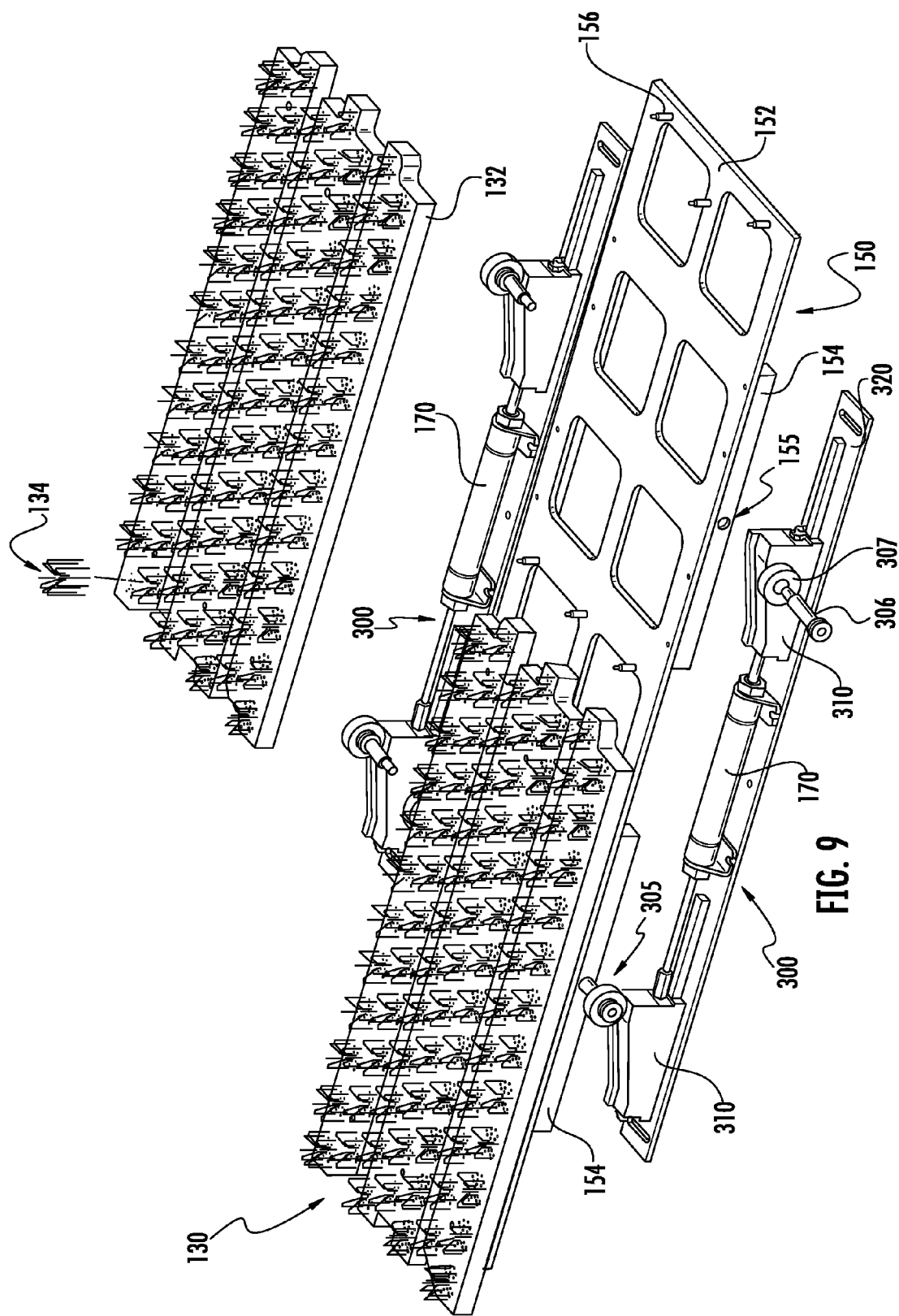
Figure 10:
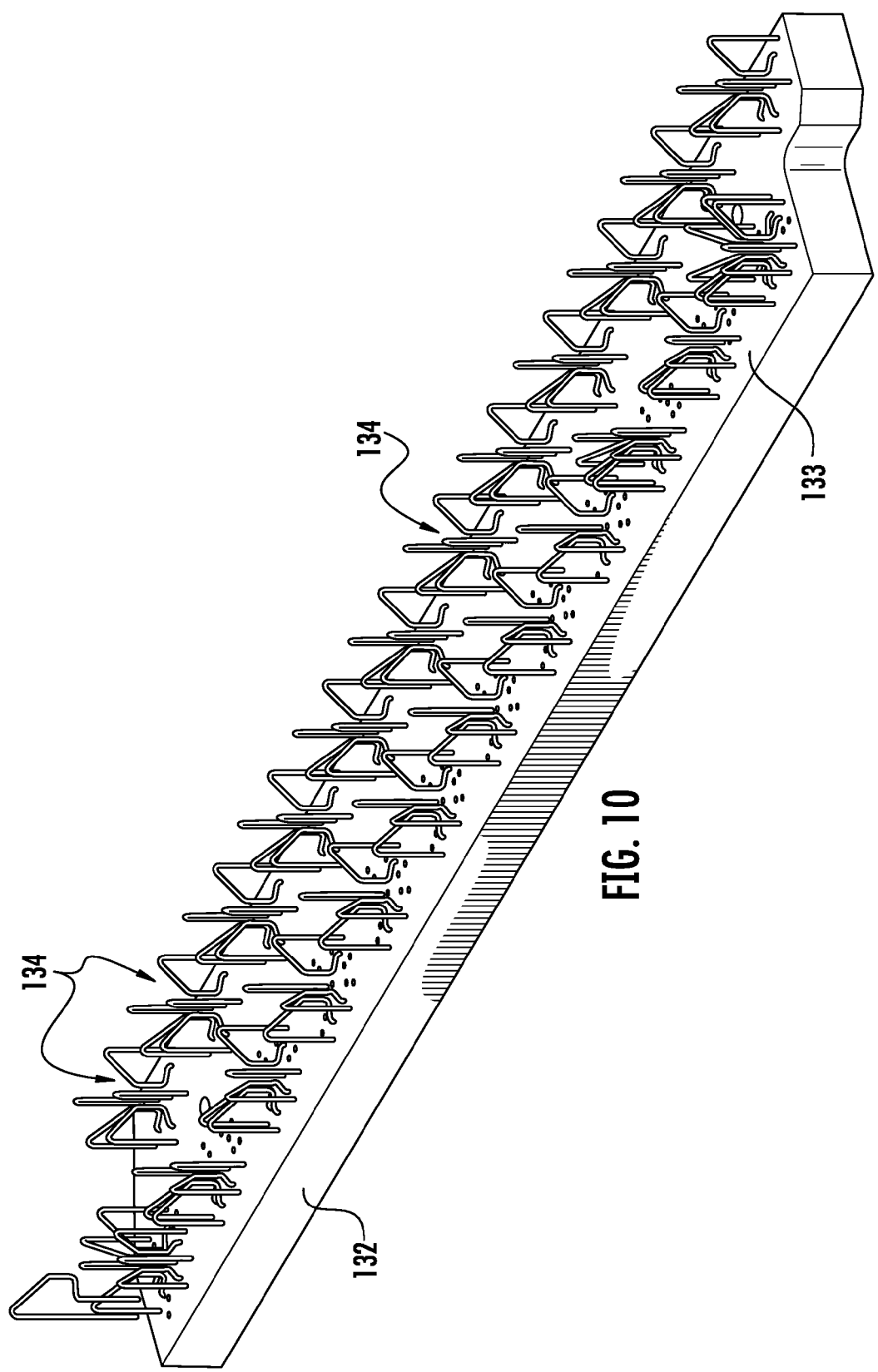
Figure 11:
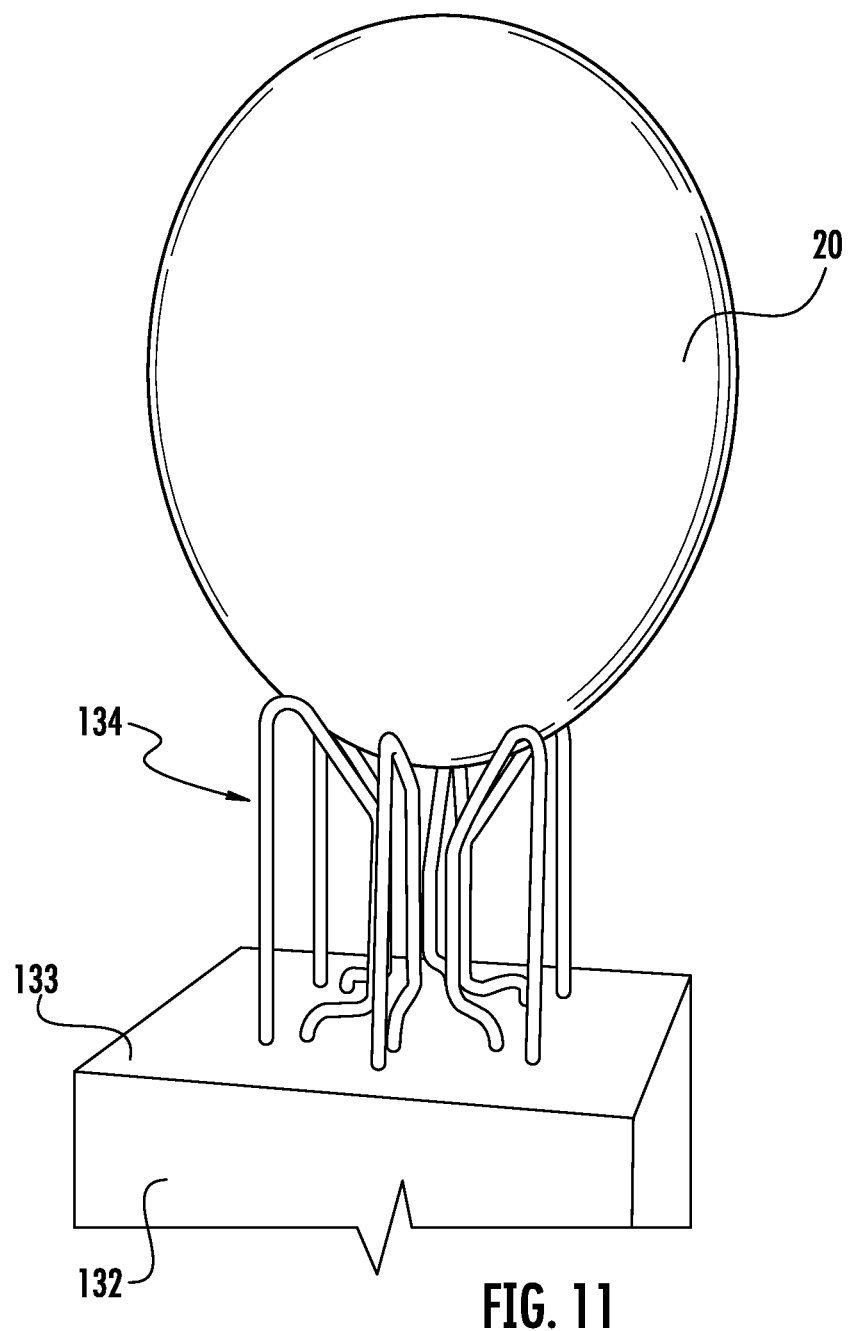
Figure 12:
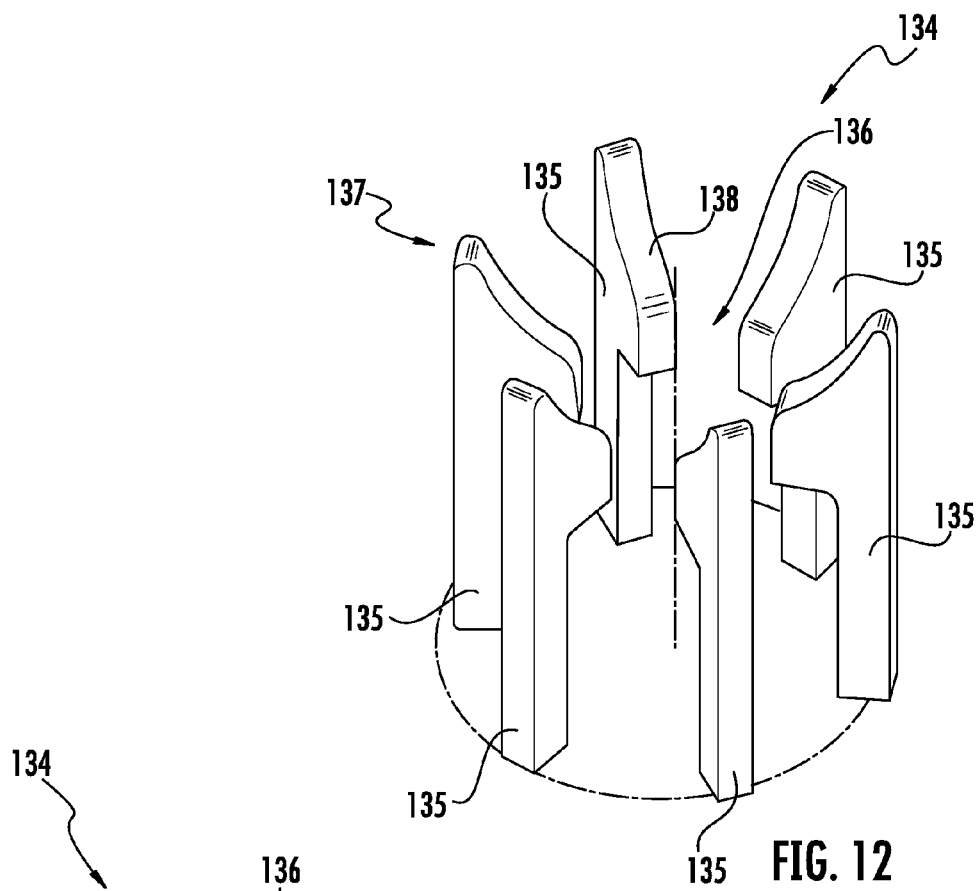
Figure 13:
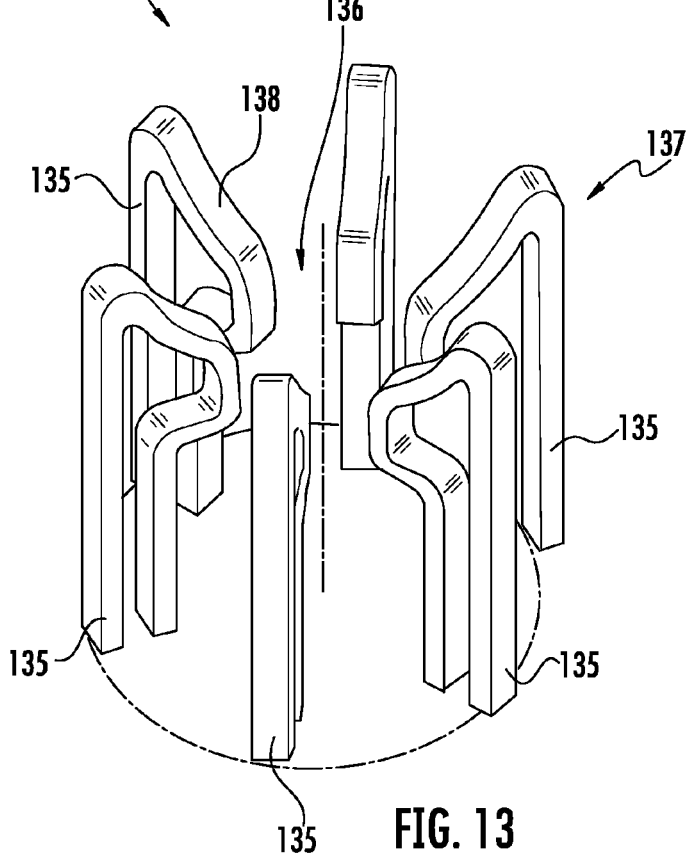
Figure 14:
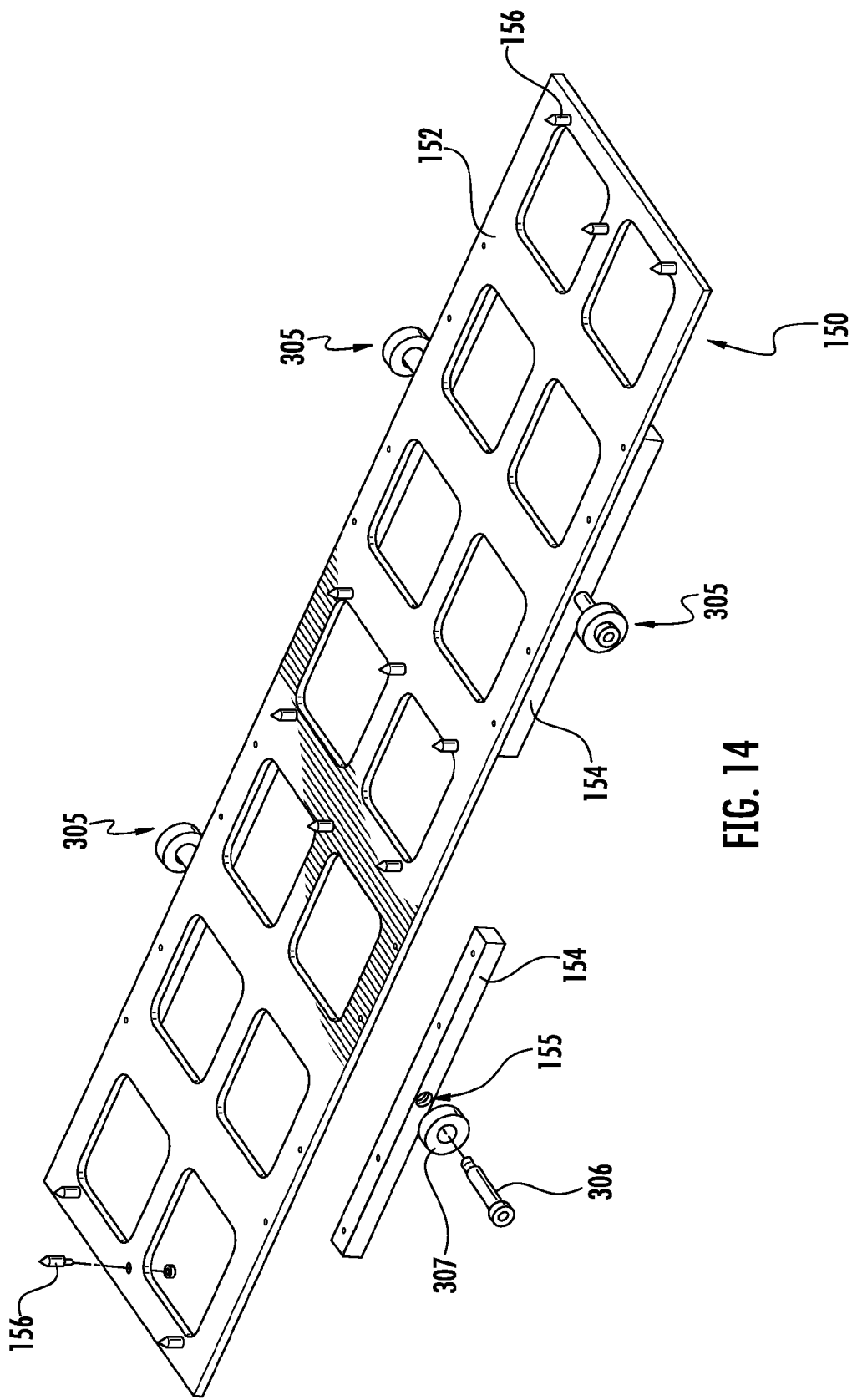
Figure 17:
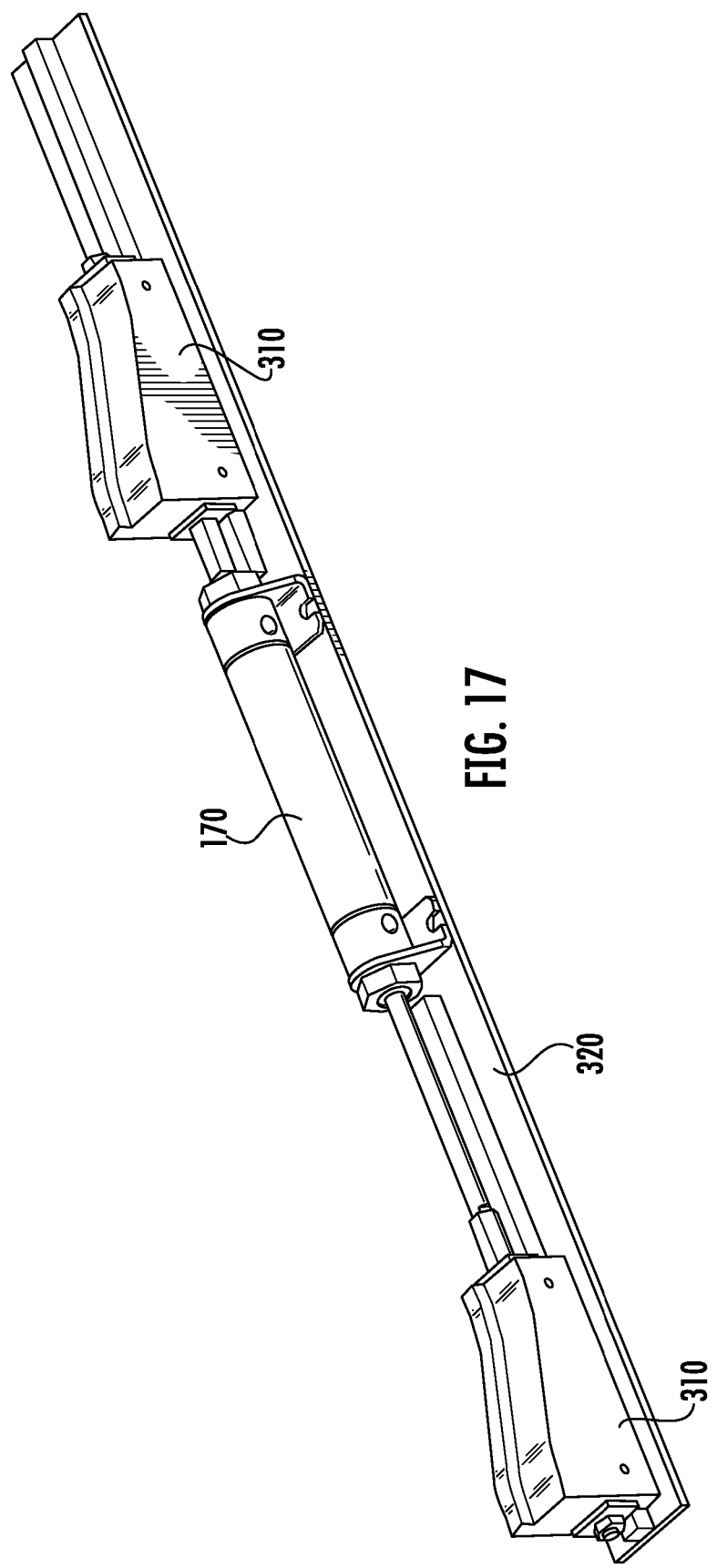
Figure 18:
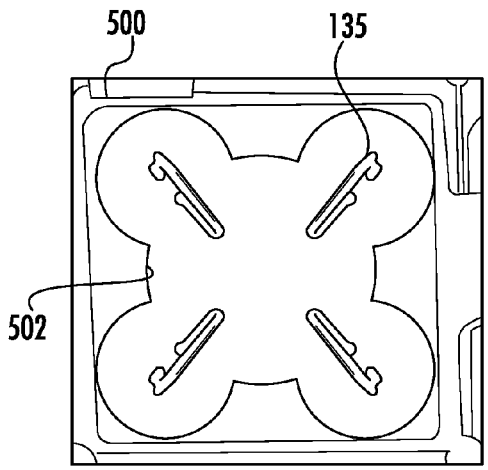
Figure 19:
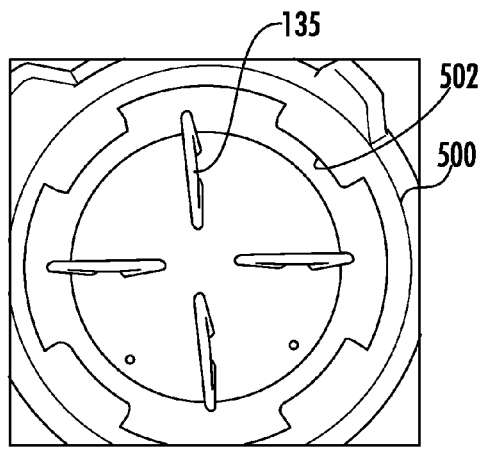
Figure 20:
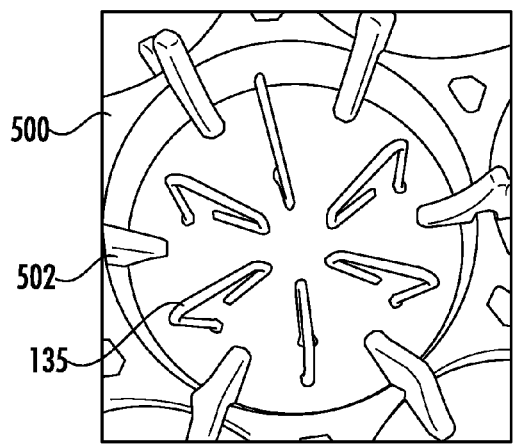
Figure 21:
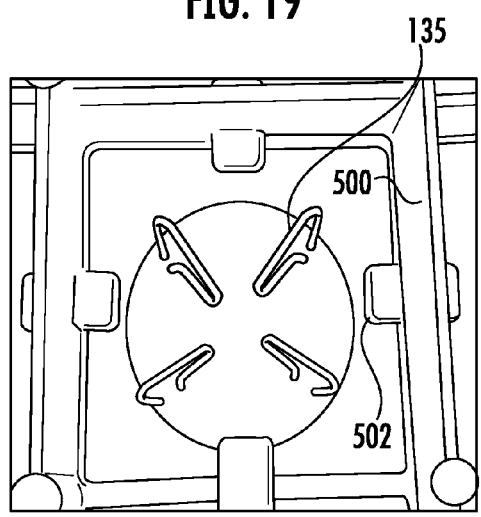
Figure 22:
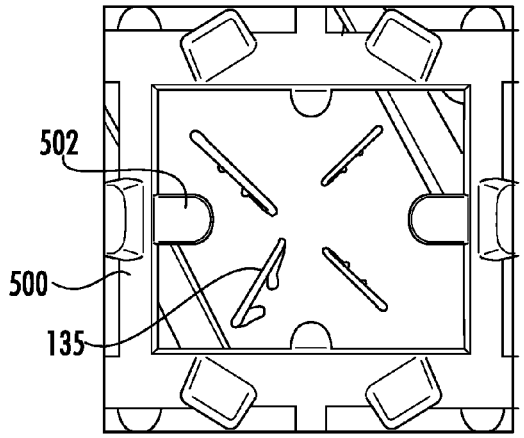
Figure 23:
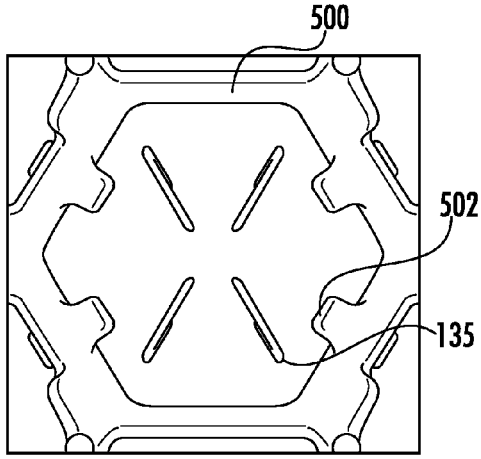

Having thus described various embodiments of the present disclosure in general terms, reference will now be made to the accompanying drawings, which are not necessarily drawn to scale, and wherein:

FIG. 1 is a perspective view of an in ovo injection apparatus having an egg support assembly, according to one aspect of the present disclosure;

FIG. 2 is a perspective view of a conventional egg flat;

FIG. 3 is a top plan view of the egg flat of FIG. 2;

FIG. 4 is a cross-sectional view of the egg flat of FIG. 3 taken along lines 4-4 and illustrating an egg supported within a pocket thereof;

FIG. 5 is a perspective view of another conventional egg flat;

FIG. 6 is a top plan view of a section of the egg flat of FIG. 5;

FIG. 7 is a partial perspective view of a conveyor assembly of an egg processing apparatus, according to one aspect of the present disclosure;

FIG. 8 is a perspective view of a conveyor assembly cooperating with an egg support assembly, according to one aspect of the present disclosure;

FIG. 9 is a partially exploded schematic view of an egg support assembly and associated drive assembly, according to one aspect of the present disclosure;

FIG. 10 is a schematic perspective view of a plate having a plurality of pedestals projecting therefrom, according to one aspect of the present disclosure;

FIG. 11 illustrates an egg supported by a pedestal of an egg support assembly, according to one aspect of the present disclosure;

FIG. 12 is a schematic perspective view of a plurality of discrete egg support members cooperating to form a seating arrangement for receiving an end of an egg, according to one aspect of the present disclosure;

FIG. 13 is a schematic perspective view of a plurality of discrete egg support members cooperating to form a wire-frame seating arrangement for receiving an end of an egg, according to one aspect of the present disclosure;

FIG. 14 is a partially exploded schematic perspective view of a frame assembly of an egg support assembly, according to one aspect of the present disclosure;

FIG. 15 is a schematic perspective view of an egg support assembly illustrated in a retracted position, according to one aspect of the present disclosure;

FIG. 16 a schematic perspective view of an egg support assembly illustrated in an extended or operative position, according to one aspect of the present disclosure;

FIG. 17 is a schematic perspective view of a portion of a drive assembly for an egg support assembly, according to one aspect of the present disclosure; and FIGS. 18-23 illustrate various configurations of pedestals in accordance with aspects of the present disclosure for corresponding with various egg flat configurations.

DETAILED DESCRIPTION OF THE DISCLOSURE

Various aspects of the present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

The present disclosure is directed to assemblies, apparatuses and methods for supporting eggs during a processing sequence or event. According to some aspects, the present disclosure provides improves support means for supporting eggs. Such support aspects of the present disclosure provide many advantages, including reducing customization efforts to account for various configurations of egg flats, improving ease of maintenance, and improving reliability.

Methods, assemblies and apparatuses according to aspects of the present disclosure may be utilized to inject eggs or otherwise process eggs. Aspects of the present disclosure, however, are not limited to in ovo injection apparatuses that inject eggs, but may be applied to any egg processing system in which it is desirable to either support an egg in an egg flat or lift an egg from the egg flat. For example, the egg support means described herein may be used in conjunction with an egg removal system for removing eggs from an egg flat, wherein it may be desirable to lift the eggs from the egg flat prior to engagement of individual removal devices of the egg removal system with the eggs. Additionally, aspects of the present disclosure may beneficially lift plates related to egg processing vertically while maintaining a parallel plane with a plane defined by various egg processing devices.

Referring now to FIG. 1, an exemplary egg processing apparatus (e.g., in ovo injection apparatus 100) incorporating an egg support assembly is illustrated. The illustrated in ovo injection apparatus 100 includes a frame 110 that supports a conveyor system 112 and a plurality of egg injection devices 25 with fluid delivery means such as needles positioned therein in accordance with known techniques. In ovo injection of substances (as well as in ovo extraction of materials) typically occurs by piercing an egg shell to form an opening (e.g., via a punch), extending an injection needle through the hole and into the interior of the egg (and in some cases into the avian embryo contained therein), and injecting treatment substance(s) through the needle and/or removing material therefrom. For example, each egg injection device 25 of the apparatus 100 may include a punch and an injection needle, with the punch surrounding the needle in coaxial relationship therewith. The punch may be configured to pierce the shell of an egg so as to form an opening therein and the needle may be configured to deliver a substance into the egg via the opening.

Egg flats utilized in conjunction with the apparatus 100 may typically contain an array of pockets that are configured to support a respective plurality of eggs in a generally upright orientation. An exemplary egg flat 15 is illustrated in FIGS. 2-4. The illustrated egg flat 15 includes a plurality of rows of pockets 32. Each pocket 32 may be configured to receive one end 17 of a respective egg 20 so as to support the respective egg 20 in a substantially vertical position. Each pocket 32 of the illustrated egg flat 15 contains a plurality of tabs 34 that are configured to support a respective egg as illustrated in FIG. 4. The illustrated flat 15 holds a plurality of eggs 20 in a substantially upright position and is configured to provide external access to predetermined areas of the eggs 20. Specifically, each egg 20 may be contacted from above the flat 15 and from beneath the flat 15. Each egg 20 is held by the illustrated flat 15 so that a respective end thereof is in proper alignment relative to a corresponding one of the egg injection devices 25.

FIGS. 5 and 6 illustrate another egg flat 36 that may be utilized in conjunction with the apparatus 100. The egg flat 36 is distinct from the egg flat 15 illustrated in FIGS. 2-4. Each pocket 38 of egg flat 36, as defined by the tabs 40, is configured differently than the pockets 32 of egg flat 15. There are many types and configuration of egg flats that may be utilized in conjunction with the apparatus 100. The reason for various egg flat configurations in the hatchery industry is that manufacturers of incubators typically have a specific egg flat that is configured to work with its customized equipment. Thus, the manufacturer of an incubator dictates the type or configuration of egg flat used in a hatchery operation. Examples of suitable commercial egg flats include, but are not limited to, a "CHICKMASTER 54" flat, a "JAMESWAY 42" flat and a "JAMESWAY 84" flat (in each case, the number indicates the number of eggs carried by the flat). Accordingly, each egg flat may require a customized egg support solution for supporting or lifting the eggs held within the egg flat during a processing sequence or event, such as, for example, an injection sequence to deliver a treatment substance into an egg.

As shown in FIG. 7, the conveyor system 112 may include a pair of substantially parallel rails 114 and a plurality of guides 116 therebetween. The guides 116 may be configured to slidably receive egg flats 50 placed thereon for movement along the direction indicated by arrow $A_1$. In operation, each egg flat 50 may be moved along direction $A_1$ to a position directly beneath the egg injection devices 25 or other processing devices so that the plurality of eggs within the egg flat 50 can be injected, removed, or otherwise processed. In some instances, the conveyor system 112 may include one or more endless belts 160 positioned at and along the guides 116 and capable of being driven by a drive motor 190 to transport the egg flats 50 along direction $A_1$.

According to aspects of the present disclosure, positioned between the rails 114 may be an egg support assembly 130. The egg support assembly 130 may be positioned between the rails 114 such that egg flats 50 pass over the egg support assembly 130. FIG. 8 is a perspective view of the egg support assembly 130 illustrating its location with respect to the rails 114 and the guides 116. In some instances, as shown in FIG. 9, the egg support assembly 130 may be segmented into a plurality of sections so as to permit the egg support assembly 130 to avoid interference with the guides 116 when moving between an operative position (supporting the eggs) and a retracted position (non-supporting position that allows vertical clearance between the egg support assembly 130 and the egg flat 50). As will be described below, the egg support assembly 130 may be configured to support or lift each egg in an egg flat during contact by an egg injection device 25 or other processing device.

As shown in FIGS. 9-11, the egg support assembly 130 may include one or more plates 132 having a plurality of pedestals 134 extending from an upper surface 133 of the plate 132. Each pedestal 134 may be configured to support a respective egg, as shown particularly in FIG. 11, in an egg flat positioned thereover, as will be described below. In some instances, the pedestal 134 may be configured in such a manner that it provides complete and entire support to the egg during a processing sequence. That is, the pedestal 134 may lift the egg from the egg flat in such instances so that the egg does not contact the egg flat. The pedestals 134 may be arranged on the plate 132 in a pattern matching or corresponding to the array of pockets in an egg flat.

Each pedestal 134 may include a plurality of egg support members 135 cooperating to form a seating arrangement portion 136 for receiving and contacting an end of an egg so as to provide support thereto. The egg support members 135 may be discrete and separate so as to allow for various arrangements and configurations on the plate 132 so as to allow cooperative engagement with various egg flat configurations and associated pockets thereof. The use of individual and discrete components that can be arranged in various configurations removes the laborious customization work associated with prior art egg support assemblies. In this regard, the discrete egg support members 135 may be capable of being arranged in a plurality of geometric configurations with respect to the plate 132. To that end, the adjustable and discrete egg support members 135 provide significant advantages over prior customized pedestals since the tabs of an egg flat limit the width or circumference of such prior customized pedestals. By providing discrete egg support members 135, the individual egg support members 135 may be located or positioned between the tabs, as shown in FIGS. 18-23, thereby widening or otherwise increasing the overall footprint of the pedestal 134 and seating arrangement 136. Such increased footprint may facilitate easier access for an egg to be received within the seating arrangement 136, which may be particularly advantageous when the egg to be supported is oriented off the vertical axis within the pocket of the egg flat.

A distal end 137 of the pedestal 134 may have a concave or funnel configuration as defined by inclined upper portions 138 of the egg support members 135, which themselves may have a radial portion. In some instances, the egg may rest completely and entirely on the seating arrangement portion 136 of the pedestal 134. The egg support members 135 may be spaced-apart and arranged in an angular orientation with respect to one another.

According to aspects of the present disclosure, each discrete egg support member 135 forming the pedestal 134 may be a shaped wire form such that the pedestal 134 is formed of a rigid wireframe structure, as shown in FIGS. 9, 10, 11 and 13. In other instances, as shown in FIG. 12, the egg support members 135 may be solid slices or pieces cooperating to form the pedestal 134 and seating arrangement portion 136. In some instances, the egg support members 135 forming the pedestal 134 may be substantially identical, while in other instances having various configurations. In any instance, the egg support members 135 may be constructed and configured in such a manner that provides rigid support to an egg. In this regard, the egg support members 135 may be formed of a rigid material or construction. Such rigidity may also provide extended life to the pedestal 134 and egg support assembly 130. In other instances, however, the egg support members 135 may be formed of a resilient material that allows for deflection when receiving and contacting an egg. The egg support members 135 may be constructed from any material, including plastic and metal materials. In some instances, the egg support members 135 may be constructed of stainless steel due to its rigidness and hygienic quality.

By using the discrete egg support members 135, the pedestal 134 may be efficiently arranged to accommodate various egg flat configurations, while significantly reducing the costs associated with each pedestal 134. For example, by providing identical egg support members 135 constructed of rigid metal wire, the egg support members 135 may be press-fit into the plate 132 in a desired geometric configuration to cooperate with any given egg flat type. In some instances, the plate 132 may be provided with pre-drilled holes that allow the egg support members 135 to be arranged in multiple patterns so as to accommodate multiple egg flat type configurations. In this regard, the egg support members 135 may be easily and advantageously adjustable to accommodate various egg flat type configurations.

FIGS. 18-23 illustrate various positioning arrangements of the egg support members 135 to form pedestals 134 capable of accommodating various configurations of an egg flat 500 having tabs 502. As shown, the number of egg support members 135 used to form pedestals 134 may vary as depending on the configuration of the egg flat 500 and/or associated tabs 502. Furthermore, in some instances, the egg support members 135 may be arranged in a symmetrical geometric configuration, while in other instances the egg support members 135 may be arranged at varying angular orientations with respect to one another such that the geometric arrangement is asymmetrical. In some instances, the geometric arrangement of the egg support members 135 may have multiple lines of symmetry.

Referring now to FIGS. 7-9 and 14-17, the plate(s) 132 may be movably secured between rails 114 via a lifting device 150. Lifting device 150 may include a frame 152 extending between opposite rails 114 and a plurality of brackets 154 coupled or secured to the frame 152. The frame 152 may include a plurality of posts 156 that are received within corresponding holes defined by the plate(s) 132 so as to securely couple the frame 152 and plate(s) 132. Such a configuration may facilitate easy removal of plates 132 for cleaning and maintenance.

A drive assembly 300 may be provided to move the egg support assembly 130 between the operative and retracted positions. In some instances, the drive assembly 300 may be configured to move the lifting device 150 such that the egg support assembly 130 can be moved between the operative and retracted positions. According to one aspect, the brackets 154 may define a plurality of apertures 155 such that the drive assembly 300 can be coupled to the lifting device 150. For example, the drive assembly 300 may include a plurality of translating members 305, each having a coupling fastener 306 such as, for example, a shoulder bolt capable of being received within the aperture 155. However, in other instances, the drive assembly 300 may be directly coupled to the frame 152, rather than the brackets 154. In addition, the frame 152 and the brackets 154 may be integrally formed.

The frame 152 may be movable between an engaged (operative) position and a disengaged (retracted) position via actuators 170 of the drive assembly 300. The illustrated actuators are pneumatically controlled and receive pressurized air via nozzles. Other types of actuators may be utilized including, but not limited to, hydraulic actuators, electromagnetic actuators, electronic actuators, etc. and/or combinations thereof. Aspects of the present disclosure are not limited to pneumatic actuators.

Each actuator 170 may drive one or more ramp members 310 back and forth along a first axis 400. The ramp members 310 may move along a guide member 320 secured to one of the rails 114, as shown in FIGS. 7 and 8. Movement of the ramp member 310 may cause an associated translating member 305 to move upward and downward within a slot 118 defined by the rail 114 along a second axis 450 substantially perpendicular or orthogonal to the first axis 400. While the translating member 305 is illustrated as moving vertical within the slot 118, it will be understood that the translating member 305 and corresponding slot 118 could be configured such that the translating member 305 moves at any non-parallel axis with respect to the first axis 400. That is, the translating member 305 may be translated along any non-parallel axis, with respect to the first axis 400, wherein one of the options may be to move the translating member 305 along an axis perpendicular to the first axis 400. The translating member 305 may include a rotatable portion 307 configured to rotate about the coupling fastener 306. The rotatable portion 307 may be in contact with a respective ramp member 310.

FIG. 15 illustrates the egg support assembly 130 in the retracted position. In operation, the ramp members 310 may be actuated to move along the first axis 400. The ramp members 310 interact with the rotatable portions 307 of the translating members 305 such that the rotatable portions contact and rotate along the ramp members 310 to move within the slot 118 along the second axis 450. As the rotatable portion 307 moves up the ramp member 310, the egg support assembly 130 may be moved to the operative position, as shown in FIG. 16, for supporting eggs in the egg flat position thereabove. To return to the retracted position, the actuators 170 cause the ramp members 310 to move along the first axis 400 in the opposite direction, thereby causing the rotatable portion 307 to move down the ramp member 310 and the coupling fastener 306 to move downwardly within the slot 118. As such, the frame 152 may be lowered such that the egg support assembly 130 is in the retracted position, allowing the egg flat to pass thereover. The rotatable portion 307 may also slidingly engage the ramp member 310 such that in some instances the rotatable portion 307 does not rotate but instead slides along the ramp member 310. In some instances, a non-rotatable sliding member may be provided in place of the rotatable portion 307 for engaging the ramp member 310 to move the frame 152 between the operative and retracted positions.

When the frame 152 is moved to the engaged position, the egg support assembly 130 supported thereon may be moved upwardly so that each pedestal 134 attached thereto extends into the pocket of an egg flat and supports a respective egg during an in ovo injection sequence or other processing sequence. According to aspects of the present disclosure, each pedestal 134 may raise each egg slightly from the egg flat, although this is not required.

In operation, an egg flat 50 containing a plurality of eggs 20 is moved over the egg support assembly 130 prior to injection by the egg injection devices 25. The frame 152 of the egg support assembly 130 may be moved upwardly by the drive assembly 300 such that the plate 132 containing a plurality of pedestals 134 is moved upwardly until each pedestal 134 engages a respective egg 20. The egg injection devices 25 contact the eggs, which are supported by the pedestals 134, form an opening in the shell thereof and deliver a predetermined dosage of a treatment substance into (and/or remove a substance from) the egg via the opening. In some instances, such as removal of eggs from the egg flat via egg remover devices, it may be desirable to lift the eggs from the egg flat using the egg support assembly 130 of the present disclosure such that the egg flat does not interfere with the egg remover device.

Many modifications and other aspects of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An egg processing apparatus, comprising:
    a plurality of egg processing devices configured to interact with a plurality of eggs carried by an egg carrier;
    an egg support assembly positioned beneath the egg processing devices and being movable between an operative position extending through the respective egg carrier and a retracted position below the egg carrier, the egg support assembly having a plurality of pedestals, each pedestal having a plurality of discrete egg support members cooperating to form a seating arrangement portion upon which a respective egg is supported entirely thereby when in the operative position to support the eggs during an egg processing event; and
    wherein each discrete egg support member is a shaped wire form such that each pedestal is formed of a rigid wireframe structure for supporting a respective egg entirely.

2. The egg processing apparatus according to claim 1, wherein the egg support assembly further comprises:
    a frame movable between the operative position and the retracted position; and
    a plate operably engaged with the frame, the pedestals being operably engaged with the plate such that the pedestals engage respective eggs in the egg carrier when the frame is in the operative position.

3. The egg processing apparatus according to claim 2, wherein the frame is movable via a drive assembly having a plurality of actuators.

4. The egg processing apparatus according to claim 3, wherein each actuator operably engages at least one ramp member movable along a first axis, the drive assembly further having a plurality of translating members operably engaged with the frame and configured to interact with a respective ramp member, the translating members being movable along a second axis non-parallel to the first axis, and further wherein movement of the ramp members along the first axis causes movement of the translating members along the second axis so as to facilitate movement of the frame between the operative and retracted positions.

5. The egg processing apparatus according to claim 4, wherein each translating member has a rotatable portion configured to interact with a respective ramp member.

6. A method of supporting eggs during an egg processing sequence, the method comprising:
    positioning an egg carrier containing a plurality of eggs beneath a plurality of egg processing devices configured to interact with respective eggs in the egg carrier for processing thereof; and
    moving an egg support assembly positioned held in a retracted position beneath the egg carrier to an operative position such that each of a plurality of pedestals contact and support a respective egg within the carrier, each pedestal having a plurality of discrete egg support members cooperating to form a seating arrangement portion for contacting and entirely supporting an end of the respective egg in the egg carrier; and
    wherein each discrete egg support member is a shaped wire form such that each pedestal is formed of a rigid wireframe structure for supporting a respective egg entirely.

7. The egg processing apparatus according to claim 1, wherein the discrete egg support members are substantially identical.

8. The egg processing apparatus according to claim 1, wherein the seating arrangement portion, upon which the egg rests entirely, has a concave configuration for receiving an end of each respective egg.

9. The method according to claim 6, wherein moving an egg support assembly to an operative position comprises moving a plurality of ramp members along a first axis using a plurality of actuators, thereby causing interaction with and movement of a plurality of translating members along a second axis non-parallel to the first axis, the translating members being operably engaged with the egg support assembly such that movement of the translating members along the second axis facilitates movement of the egg support assembly between the operative position and a retracted position.

10. The method according to claim 6, wherein the seating arrangement, upon which the egg rests entirely, has a concave configuration for receiving the end of the egg.

* * * * *